United States Patent

Hwang

[11] Patent Number: 5,903,307
[45] Date of Patent: May 11, 1999

[54] DEVICE AND METHOD FOR CORRECTING AN UNSTABLE IMAGE OF A CAMCORDER BY DETECTING A MOTION VECTOR

[75] Inventor: Jung-Hyun Hwang, Seoul, Rep. of Korea

[73] Assignee: Samsung Electronics Co., Ltd., Kyungki-do, Rep. of Korea

[21] Appl. No.: 08/706,398

[22] Filed: Aug. 29, 1996

[30] Foreign Application Priority Data

Aug. 29, 1995 [KR] Rep. of Korea .................. 95-27157

[51] Int. Cl.⁶ .................................................. H04N 5/232
[52] U.S. Cl. .......................................... 348/208; 348/699
[58] Field of Search .................. 348/208, 699, 348/343, 344, 345, 352, 361, 337; 382/107; 396/121, 122, 123; 359/710

[56] References Cited

U.S. PATENT DOCUMENTS

| | | | |
|---|---|---|---|
| 3,497,283 | 2/1970 | Law | 348/337 |
| 3,547,521 | 12/1970 | Tadashi et al. | 348/337 |
| 4,882,619 | 11/1989 | Hasegawa et al. | 348/337 |
| 4,912,496 | 3/1990 | Tamada et al. | 348/337 |
| 4,980,771 | 12/1990 | Ueda et al. | 348/312 |
| 5,189,518 | 2/1993 | Nishida | 348/208 |
| 5,319,456 | 6/1994 | Nishida | 348/208 |
| 5,450,126 | 9/1995 | Nishida | 348/208 |
| 5,457,494 | 10/1995 | Suga et al. | 348/229 |
| 5,635,725 | 6/1997 | Cooper | 359/555 |

*Primary Examiner*—Wendy Garber
*Attorney, Agent, or Firm*—Sughrue, Mion, Zinn, Macpeak & Seas, PLLC

[57] ABSTRACT

A device and method for detecting a motion vector of a camcorder are disclosed. A main pick-up unit changes an image into an electrical signal, a vertical image pick-up segment calculates a correlation value between a present vertical line unit and a previous vertical line unit, and a horizontal segment calculates a correlation value between a present horizontal line unit and a previous horizontal line unit. The process is repeated through the limits of a searching area and for each pixel in the vertical and horizontal line pick-up units, and the correlation values are accumulated. Then the minimum vertical and horizontal correlation values are selected as the motion vector.

14 Claims, 7 Drawing Sheets

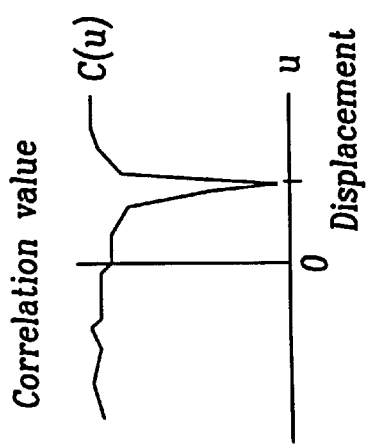
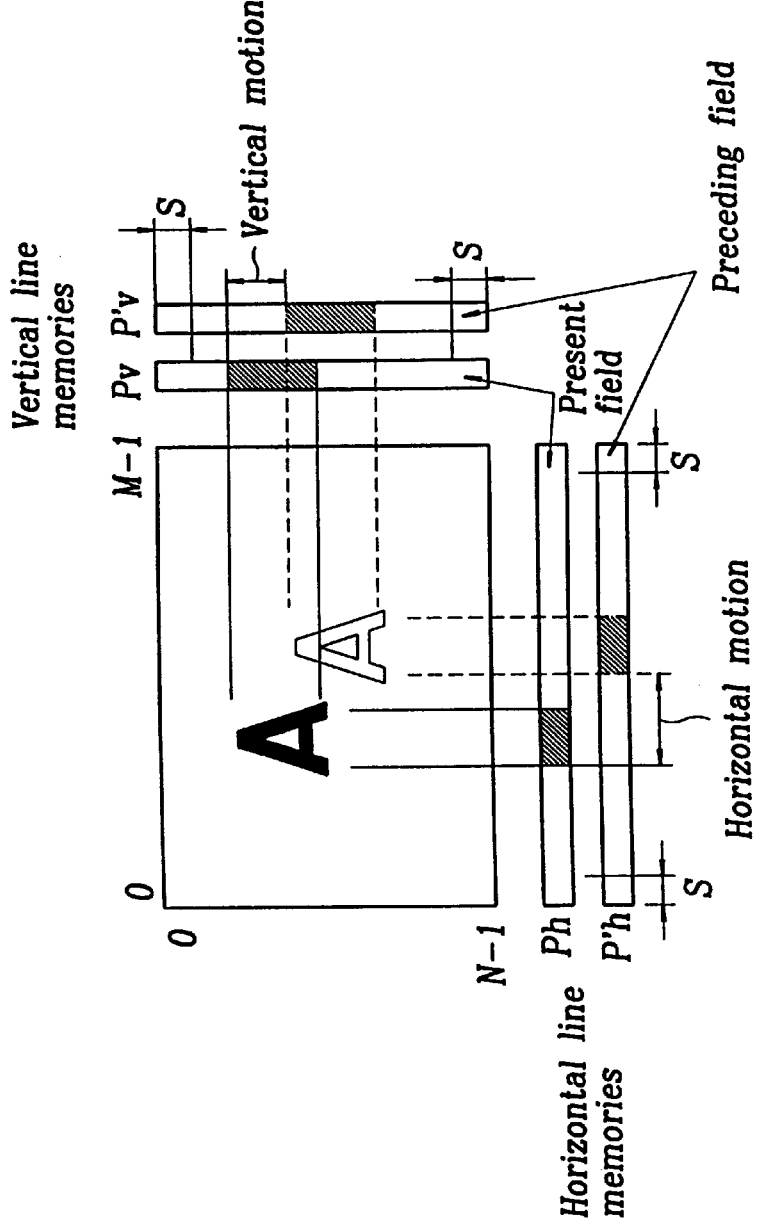
FIG.2A
PRIOR ART
FIG.2B
PRIOR ART

DEVICE AND METHOD FOR CORRECTING AN UNSTABLE IMAGE OF A CAMCORDER BY DETECTING A MOTION VECTOR

BACKGROUND OF THE INVENTION

1. Field of the Invention

The present invention relates to a device and method for detecting a motion vector of a camcorder (camera recorder). More specifically, the present invention relates to detection of a motion vector for the purpose of correcting an unstable image of a camcorder caused by unstable hands.

2. Description of the Prior Art

Detection of a motion vector from a dynamic image signal is an essential technique in the compression, recognition, stabilization, etc. of an image.

When a portable video camera is used in conjunction with a VCR (videocassette recorder) to take a picture, an image input to the camera is likely to be unstable and shaking, especially when the user is walking or in a moving vehicle. A common problem of camcorders is that when a picture is highly magnified, the instability caused by unstable hands is more pronounced.

A solid state pick-up device is widely used as an input device of a camcorder. The solid state pick-up device is an image pick-up device made from a semiconductor chip which does not use electron beams. There are two types of solid state pick-up device—a MOS type which uses a metal oxide semiconductor (MOS) transistor in a light receiver, and a CCD type (charge coupled device).

In the following, an existing image correction system will be explained in connection with the accompanying drawings, wherein FIG. 1 is a block diagram showing a conventional image correction system, and FIG. 2 is a conceptual diagram showing a conventional method of one-dimensionally detecting a motion vector of an image.

As shown in FIG. 1, a conventional image correction system for the purpose of stabilizing an image includes:

a CCD imager 11 (a solid state pick-up device) which picks up an input image in a solid state device through an optical system, scans the image electronically within the solid state device, and converts the image into an electrical signal to be outputted;

an analog/digital converter 12 (referred to as A/D converter hereinafter) which converts an analog signal outputted from the CCD imager 11 into a digital signal to be outputted;

a camera signal processing unit 13 which converts a signal outputted from the A/D converter into a color and brightness signal to be outputted;

a motion vector detecting unit 14 which, from a signal outputted from the A/D converter 12, detects a motion vector caused by unstable hands to output a motion vector;

a memory control unit 15 which receives a motion vector outputted from the motion vector detecting unit 14 to control the location of an area to be corrected;

a field memory 16 which holds a field unit (or a frame unit) of image data outputted from the camera signal processing unit 13 and, according to the image correction control by the memory control unit 15, outputs a stabilized image signal; and a digital/analog converter 17 (referred to as D/A converter hereinafter) which converts a digital image signal outputted from the field memory 16 into an analog image signal to be outputted.

In such an image correction system, correlation values are calculated between image data selected out of an image which is continuous in time, and a motion vector is determined from the point where the minimum correlation value results.

In general, a block matching algorithm is widely used to calculate the correlation value. In order to solve the problems of calculative complexity and real-time processing, it has been suggested to use various techniques such as pyramid search, logarithmic search and so on. A two-dimensional block matching algorithm, however, entails a rapid increase in the number of arithmetic operations with an increase in the number of pixels to be considered. On the other hand, when the number of pixels to be considered is decreased, the algorithm is likely to produce erroneous results such as a local minimum in which only a local area is stabilized.

As shown in FIG. 2, a general method has also been used which one-dimensionally extracts and corrects motion data throughout the entire area of the image by projecting an image pattern.

After an image pattern has been projected or accumulated in the direction of horizontal and vertical axes, the accumulation result is compared with the accumulation result of the preceding image pattern to calculate correlation values between them. A displacement quantity between the two fields is determined from the point where the minimum correlation value results. The x and y axes form the basis for an x and y coordinate system which represents horizontal and vertical axes, respectively, of a field image. Assuming that M is the number of horizontal pixels of an image, and that N is the number of lines of an image, the horizontal correlation value, for examples can be calculated by an equation such as the following:

$$C(u) = \sum_{x=S}^{M-S} |P_h'(x+u) - P_h(x)| \quad (1)$$

In the equation (1) $P_h'$ and $P_h$ are line memories for detecting a motion vector, into which the preceding and the present image data are accumulated, respectively. u [u|−S≧u≧S] is an integer within a searching area ±S, and it represents a displacement variable. As shown in the equation (1), in each definition area, if a variable u results in the minimum value among the sums of the differences between the accumulation values of the preceding field and of the present field, the variable u is considered to be the optimum displacement of an image. Compared with a two-dimensional matching algorithm, a one-dimensional signal matching algorithm enables the calculation of a motion vector using fewer arithmetic operations than the two-dimensional algorithm, even when there is a large displacement of an image.

The one-dimensional signal matching algorithm, however, has a time restriction in that the calculation of correlation should be finished before the raster scanning of the next field begins, since the projection or accumulation of the present field image data is completed when the raster scanning of an input image comes to an end point. Further, an inputted pixel should be converted into a low quantized level (a binary signal, etc.) in order to economize on the projection memory. Also, the determination of a threshold value in the conversion of pixels into a binary signal, a processing method through the extraction of contours of an image and so on, can lead to the loss of some pixel data. In addition, two pairs of line memories are required, of which one pair corresponds to N, the number of lines of an input image, and the other one to M, the number of horizontal pixels, and, accordingly, a complex calculating algorithm is required.

SUMMARY OF THE INVENTION

It is therefore an object of the present invention to solve the above problems by providing a device and method for detecting a motion vector of a camcorder, in which, besides a main CCD, separate image pick-up units are used to obtain one-dimensional image data at a high speed, a pipeline processing method is used to enable the rapid calculation of successive correlation values between image data, and line memories are economized to realize a simple circuit.

In order to attain the above object, the present invention comprises:

a vertical image pick-up unit which horizontally condenses an inputted image and converts the horizontally condensed image into an electrical signal to be outputted;

a vertical A/D converter which converts an analog signal outputted from the vertical image pick-up unit into a digital signal to be outputted;

a vertical delay register which holds a signal outputted from the vertical A/D converter for a given times then outputs the signal;

a vertical line memory which holds a signal outputted from the vertical delay register;

a vertical correlation arithmetic unit which receives a signal outputted from the vertical A/D converter and a signal from the vertical line memory and calculates correlation values between the two signals to output a vertical motion vector;

a horizontal image pick-up unit which vertically condenses an inputted image and converts the vertically condensed image into an electrical signal to be outputted;

a horizontal A/D converter which converts an analog signal outputted from the horizontal image pick-up unit into a digital signal to be outputted;

a horizontal delay register which holds a signal outputted from the horizontal A/D converter for a given time, then outputs the signal;

a horizontal line memory which holds a signal outputted from the horizontal delay register; and a horizontal correlation arithmetic unit which receives a signal outputted from the horizontal A/D converter and a signal from the horizontal line memory and calculates correlation values between the two signals to output a horizontal motion vector.

In order to attain the above object, a signal processing method of the present invention comprises the steps of:

initializing correlation values;

picking up an image in a line CCD of the image pick-up unit;

performing an A/D conversion of an xth pixel of an image signal picked up in the line CCD;

defining the limits of a searching area within a line memory;

calculating a correlation value between the xth pixel and a value within the searching area and accumulating the correlation value;

deciding whether the calculation has been completed up to the limits of the searching area;

increasing a searching location parameter in order to return to the step of calculating, when the calculation has not been completed up to the limits of the searching area;

renewing data in the line memory, when the calculation has been completed up to the limits of the searching area;

deciding whether the calculation has been completed on every pixel picked up in the line CCD;

increasing a pixel location parameter in order to return to the step of the A/D conversion of the next pixel, when the calculation has not been completed on every pixel picked up in the line CCD;

detecting the minimum correlation value among the accumulated correlation values, when the calculation has been completed on every pixel picked up in the line CCD; and outputting the displacement of the minimum correlation value as a motion vector having a particular direction.

BRIEF DESCRIPTION OF THE DRAWINGS

FIG. 2 is a conceptual diagram which shows a conventional method of one-dimensionally detecting a motion vector of an image;

DETAILED DESCRIPTION OF THE PREFERRED EMBODIMENTS

In the followings preferred embodiments of the present invention will be described in detail in conjunction with the accompanying drawings.

Figure 1:
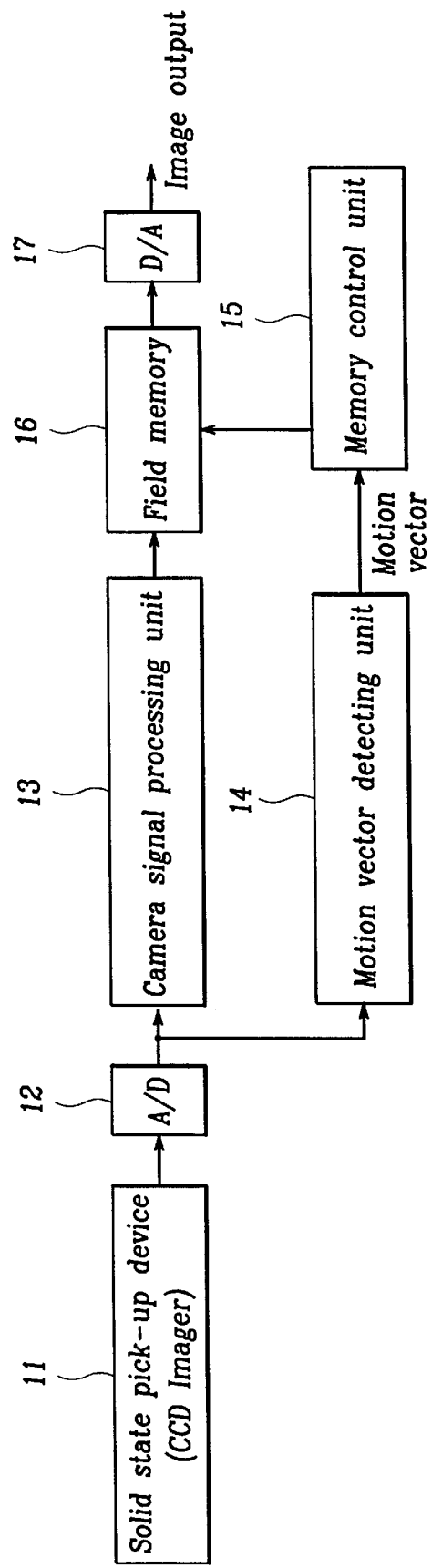
FIG. 1 is a block diagram which shows a conventional image correction system.
Figure 3:
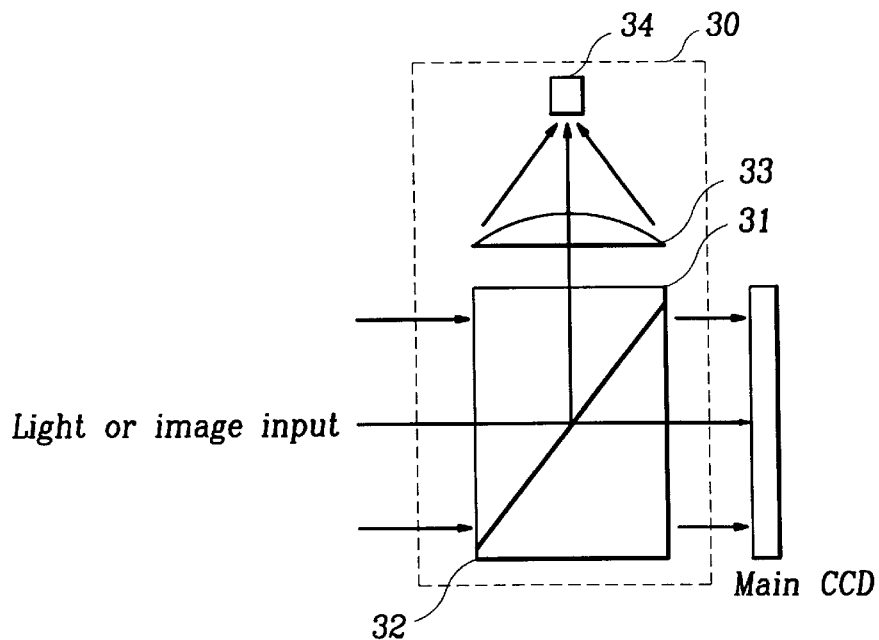
FIG. 3 is a drawing which shows the-principle of picking up an image through an image pick-up unit according to an embodiment of the present invention.
Figure 4:
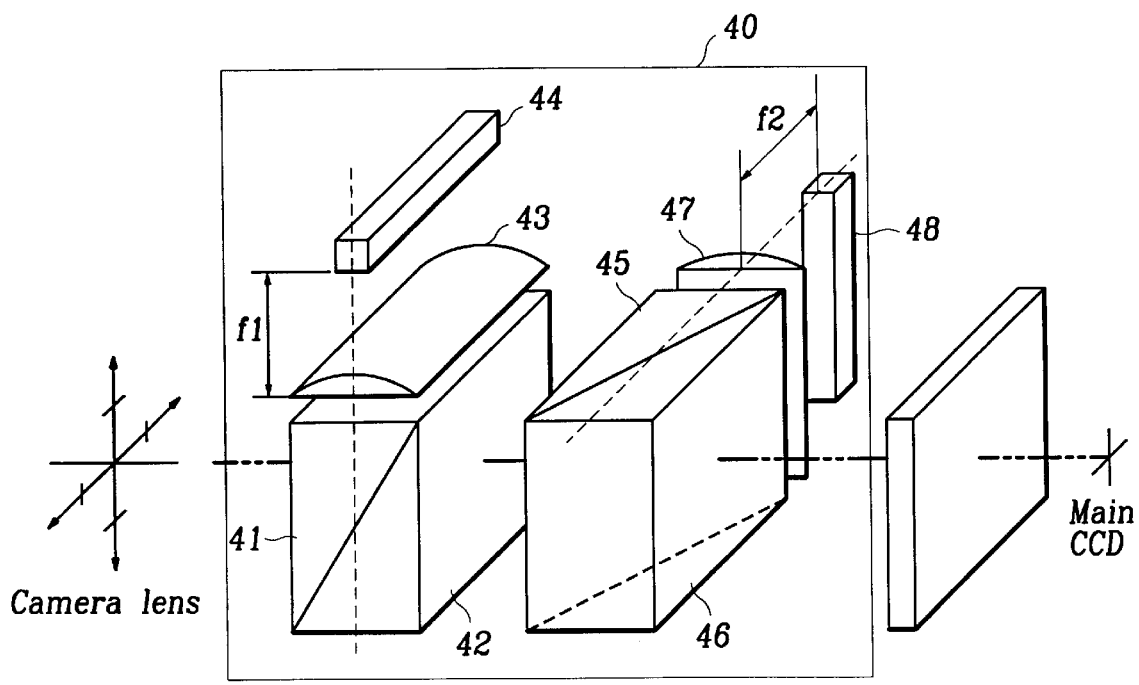
FIG. 4 is a drawing which shows horizontal and vertical image pick-up units and peripheral units.

FIG. 3 is a drawing which shows the principle of picking up an image through an image pick-up unit according to an embodiment of the present invention;

FIG. 4 is a drawing which shows horizontal and vertical image pick-up units and peripheral units according to an embodiment of the present invention.

As shown in FIG. 3, an image pick-up unit 30 according to an embodiment of the present invention comprises:

two right-angled prisms 31 and 32, the hypotenuses of which are joined to each other to form a reflection surface so that the reflection surface may reflect an inputted two-dimensional image;

a plano convex lens 33, of which the flat surface faces the reflection surface of the two right-angled prisms 31 and 32, which condenses a two-dimensional image reflected by the reflection surface into a one-dimensional image to be outputted; and a line CCD 34 which converts a one-dimensional image outputted from the plano convex lens 33 into a one-dimensional electrical signal.

In an embodiment of the present invention, as shown in FIG. 4, there are two image pick-up units, i.e., a horizontal image pick-up unit (41, 42, 43 and 44) which receives a two-dimensional image and outputs one-dimensional horizontal image data, and a vertical image pick-up unit (45, 46, 47 and 48) which receives a two-dimensional image and outputs one-dimensional vertical image data so that they form together a horizontal/vertical image pick-up unit 40.

There is a phase difference of 90 degrees (90°) between the horizontal image pick-up unit (41, 42, 43 and 44), and the vertical image pick-up unit (45, 46, 47 and 48).

Figure 5:
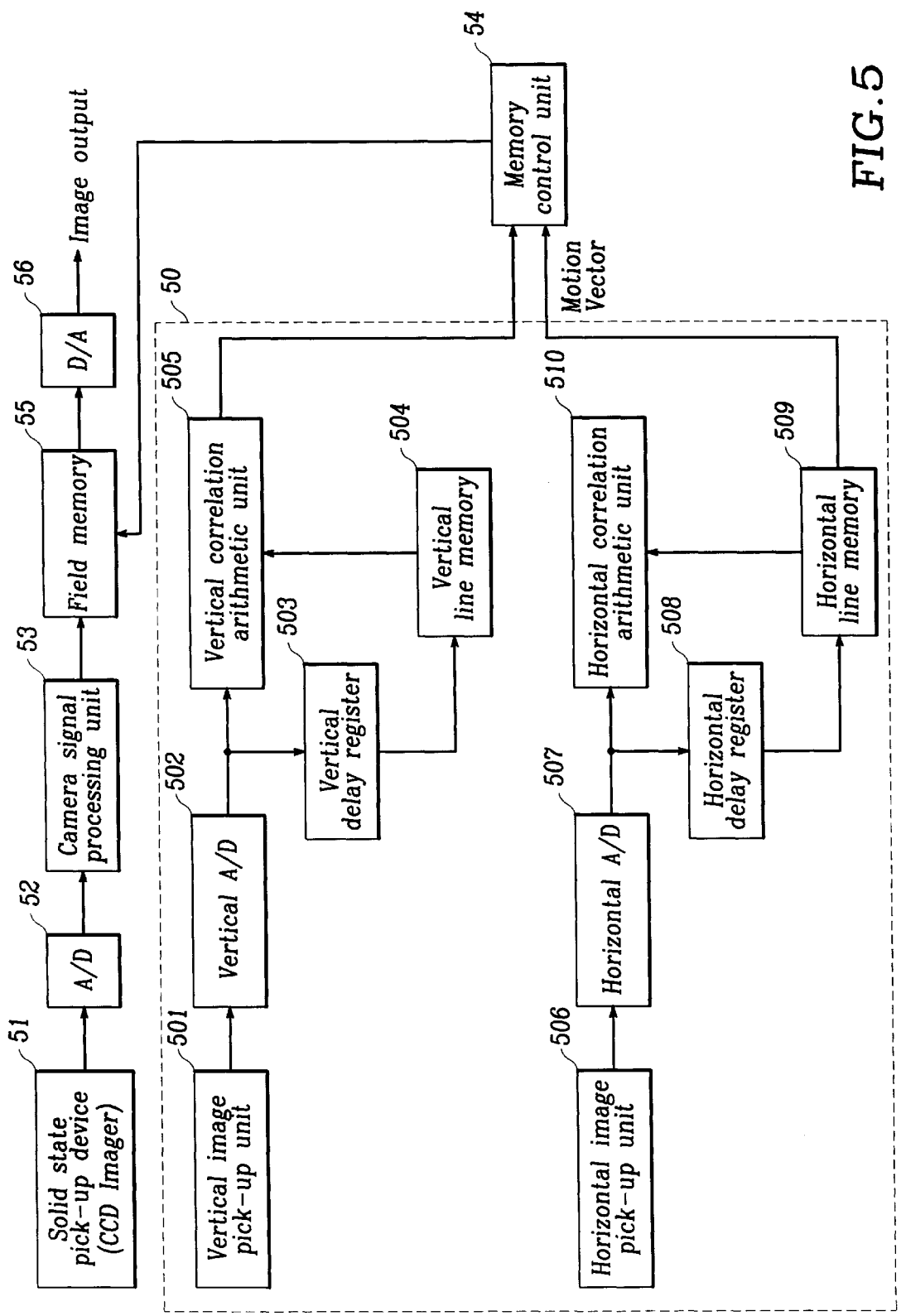
FIG. 5 is a block diagram which shows a first embodiment of an image correction system including a motion vector detecting device of a camcorder.

FIG. 5 is a block diagram which shows a first embodiment of an image correction system including a motion vector detecting device of a camcorder according to an embodiment of the present invention.

As shown in FIG. 5, an image correction system according to a first embodiment of the present invention comprises:

- a CCD imager 51 which picks up an inputted image in a solid state device through an optical system and scans the image electronically within the solid state device to convert the image into an electrical signal to be outputted;
- an A/D converter 52 which converts an analog signal outputted from the CCD imager 11 into a digital signal to be outputted;
- a camera signal processing unit 53 which converts a signal outputted from the A/D converter into a color and brightness signal to be outputted;
- a motion vector detecting device 50 which receives the same image that is inputted to the CCD imager 51 through an image pick-up unit and detects a motion vector caused by unstable hands to output a-notion vector;
- a memory control unit 54 which receives a motion vector outputted from the motion vector detecting device 50 to control the location of an area to be corrected;
- a field memory 55 which holds a field unit (or a frame unit) of image data outputted from the camera signal processing unit 53 and, according to image correction control by the memory control unit 54, outputs a stabilized image signal; and
- a D/A converter 56 which converts a digital image signal outputted from the field memory 55 into an analog image signal to be outputted.

Figure 6:
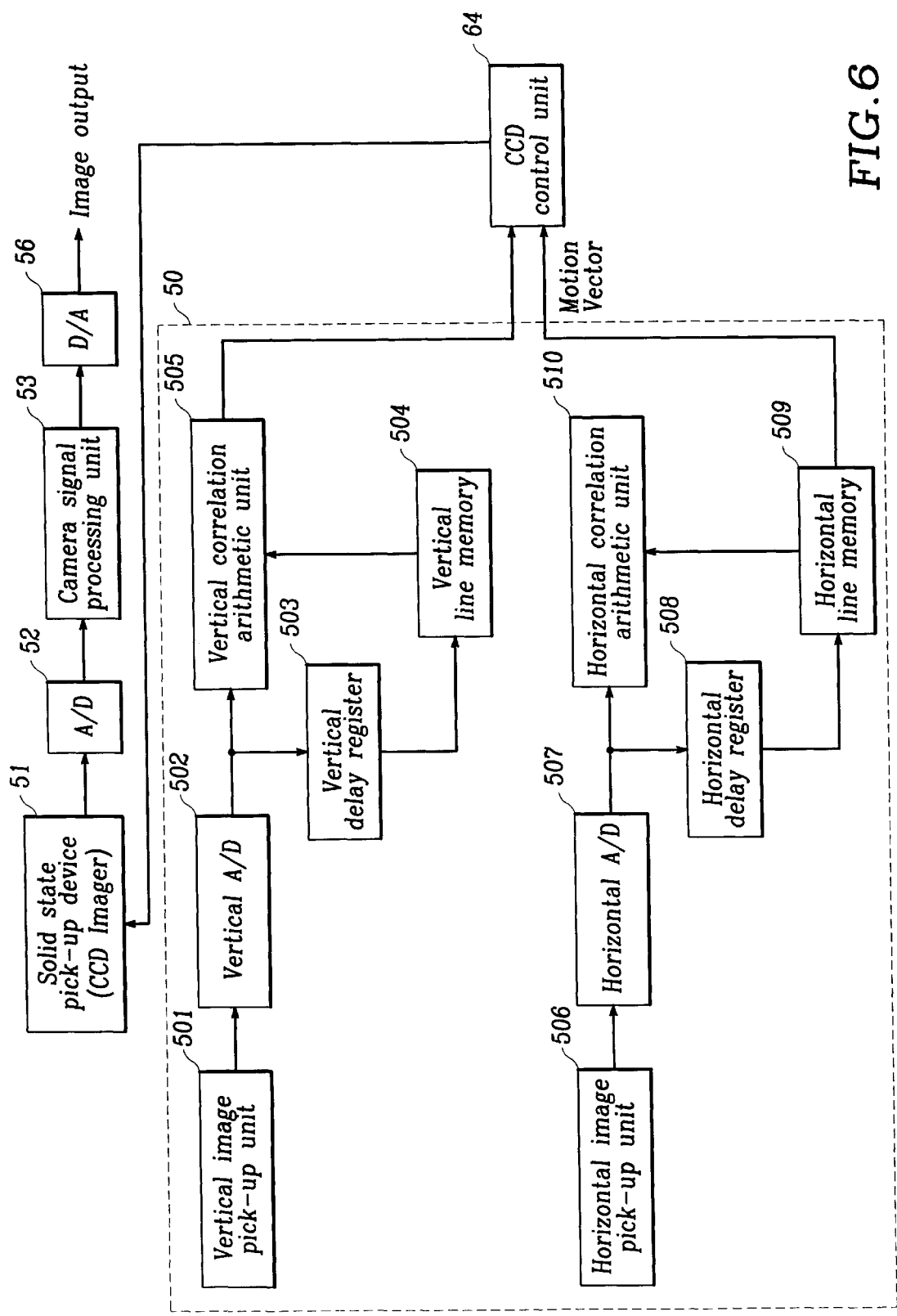
FIG. 6 is a block diagram which shows a second embodiment of an image correction system including a motion vector detecting device of a camcorder.

FIG. 6 is a block diagram which shows a second embodiment of an image correction system including a motion vector detecting device of a camcorder according to an embodiment of the present invention.

As shown in FIG. 6, an image correction system according to a second embodiment of the present invention comprises:

- a motion vector detecting device 50 which receives an image through an image pick-up unit, and detects a motion vector caused by unstable hands to output a motion vector;
- a CCD control unit 64 which receives a motion vector outputted from the motion vector detecting device 50 to output a signal for controlling the location of an area to be corrected;
- a CCD imager 51 which receives the same image that is inputted to the motion vector detecting device 50 through an optical system, and converts the image into an electrical signal to output a corrected image signal according to a control signal outputted from the CCD control unit 64;
- an A/D converter 52 which converts an analog signal outputted from the CCD imager 51 into a digital signal to be outputted;
- a camera signal processing unit 53 which converts a signal outputted from the A/D converter 52 into a color and brightness signal to be outputted;
- a D/A converter 56 which converts a digital image signal outputted from the camera signal processing unit 53 into an analog image signal to be outputted.

In the above image correction systems according to first and second preferred embodiments of the present invention, the motion vector detecting device 50, as illustrated in FIG. 5 and FIG. 6, comprises:

- vertical image pick-up unit 501 which horizontally condenses an input image and converts the horizontally condensed image into an electrical signal to be outputted;
- a vertical A/D converter 502 which converts an analog signal outputted from the vertical image pick-up unit 501 into a digital signal to be outputted;
- a vertical delay register 503 which holds a signal outputted from the vertical A/D converter 502 for a time during which pixels corresponding to half of a searching area are processed, then outputs the signal;
- a vertical line memory 504 which holds a signal outputted from the vertical delay register 503;
- a vertical correlation arithmetic unit 505 which receives a signal outputted from the vertical A/D converter 502 and a signal from the vertical line memory 504, and calculates correlation values between the two signals to output a vertical motion vector;
- a horizontal image pick-up unit 506 which vertically condenses an inputted image, and converts the vertically condensed image into an electrical signal to be outputted;
- a horizontal A/D converter 507 which converts an analog signal outputted from the horizontal image condensing unit 506 into a digital signal to be outputted;
- a horizontal delay register 508 which holds a signal outputted from the horizontal A/D converter 507 for a time during which pixels corresponding to half of a searching area are processed, then outputs the signal;
- a horizontal line memory 509 which holds a signal outputted from the horizontal delay register 508; and
- a horizontal correlation arithmetic unit 510 which receives a signal outputted from the horizontal A/D converter 507 and a signal from the horizontal line memory 509, and calculates correlation values between the two signals to output a horizontal motion vector.

In the above motion vector detecting device 50, the vertical image pick-up unit 501, as illustrated in FIGS. 4, comprises:

- two right-angled prisms 45 and 46, the hypotenuses of which are joined to each other to form a reflection surface so that the reflection surface may horizontally reflect a two-dimensional image inputted from a camera lens;
- a plano convex lens 47, of which the flat surface faces the reflection surface of the two right-angled prisms 45 and 46, which condenses a two-dimensional image reflected by the reflection surface into a one-dimensional image to be outputted; and
- a line CCD 48 which converts a one-dimensional image outputted from the plano convex lens 47 into a one-dimensional electrical signal;

In a similar way, the horizontal image pick-up unit 506, as illustrated in FIG. 4, comprises:

two right-angled prisms 41 and 42, the hypotenuses of which are joined to each other to form a reflection surface so that the reflection surface may vertically reflect a two-dimensional image inputted from a camera lens;

a plano convex lens 43, of which the flat surface faces the reflection surface of the two right-angled prisms 41 and 42, which condenses a two-dimensional image reflected by the reflection surface into a one-dimensional image to be outputted; and a line CCD 44 which converts a one-dimensional image outputted from the piano convex lens 43 into a one-dimensional electrical signal;

In the following, the operation of a device according to an embodiment of the present invention will be described in conjunction with the accompanying drawings.

First, FIG. 3 is a drawing which shows the principle of picking up an image through an image pick-up unit according to an embodiment of the present invention.

As shown in FIG. 3, the basic principle of picking up an image is to reflect a two-dimensional image horizontally or vertically by two prisms 31 and 32, to condense the reflected two-dimensional image into a one-dimensional image through a plano convex lens 33, and to pick up the one-dimensional image signal in a line CCD 34.

FIG. 4 is a drawing which shows horizontal and vertical image pick-up units and peripheral units.

As shown in FIG. 4, the horizontal/vertical image pick-up unit 40 reflects light inputted from a camera lens, i.e., a two-dimensional image vertically and horizontally through a corresponding couple of right-angled prisms 41 and 42, or 45 and 46. The vertically reflected image and the horizontally reflected image are condensed through a corresponding piano convex lens 43 or 47, and finally the vertically and horizontally condensed images are converted into electrical signals in a horizontal and vertical line CCD 44 and 48, respectively.

Assuming that an inputted image is picked up in both the horizontal line CCD 44 and the vertical line CCD 48, and that the length of the horizontal line CCD 44 is M, and the length of the vertical line CCD 48 is N, the resultant image can be represented by the following equations:

$$P_h(x) = \alpha \sum_{y=0}^{N-1} I(x, y) \qquad (2)$$

$$P_v(y) = \alpha \sum_{x=0}^{M-1} I(x, y) \qquad (3)$$

In the above expressions, (x, y) are the coordinates of an image, I (x, y) is the brightness of a pixel, and $P_h$ and $P_v$ are the vertically and horizontally condensed results, respectively. $\alpha$ is a reflection coefficient for light incident upon the reflection surface of prisms. A one-dimensional image, which has been linearly condensed, is converted into a one-dimensional electrical signal in the horizontal and vertical line CCD's 44 and 48, and is inputted to circuits 502~505 and 507~510 for detecting motion vectors.

FIG. 5 is a block diagram which shows a first embodiment of an image correction system including a motion vector detecting device of a camcorder according to an embodiment of the present invention.

As shown in FIG. 5, one-dimensional image signals $P_h$ and $P_v$, outputted from the horizontal and vertical image pick-up units 506 and 501, respectively, are converted into digital signals through the horizontal and vertical A/D converters 507 and 502. Further, in the horizontal and vertical correlation arithmetic units 510 and 505, through an equation such as equation (1), the correlation calculation is carried out between one-dimensional image signals of the preceding field from the horizontal and vertical line memories 509 and 504, and digital image signals from the horizontal and vertical A/D converters 507 and 502. A location which results in the minimum correlation value among the calculated correlation values is presumed to be the optimum movement of the image. Further, the memory control unit 54, after receiving horizontal and vertical motion vectors from the motion vector detecting device 50, on the basis of the motion vectors, sends a signal for correcting the image to the field memory 55 which holds an unstable image outputted from a CCD imager 51 (a main CCD)

In detail, an image inputted through a CCD imager 51 goes through an A/D converter 52 and further through a camera signal processing unit 53, and is stored in the field memory 55. Further, an initial location of an image to be corrected in the field memory 55 is controlled by the memory control unit 54. The field memory 55 outputs a corrected image accordingly. The corrected image outputted from the field memory 55 goes through a D/A converter 56 to be converted into an analog signal, which will be recorded in a videocassette recorder or outputted as an image. The same image that is inputted to a CCD imager 51 (a main CCD) is inputted to the horizontal and vertical image pick-up units 506 and 501, which process the inputted image independently of each other.

FIG. 6 is a block diagram which shows a second embodiment of an image correction system including a motion vector detecting device of a camcorder according to an embodiment of the present invention.

As shown in FIG. 6, a motion vector detecting device 50, a CCD imager 51, an A/D converter 52, a camera signal processing unit 53, and a D/A converter 56 of the second embodiment are the same in their constitutions and functions as those of the first embodiment of FIG. 5.

The motion vector detecting device 50, after receiving the same image that is inputted to the CCD imager 51 as mentioned above, can independently detect a motion vector. Thus, as soon as an image is picked up in the CCD imager 51, a CCD control unit 64, after receiving a motion vector outputted from the motion vector detecting device 50, can directly control the image in the CCD imager 51 to output a corrected image. Accordingly, the field memory 55 of FIG. 5 is not required in this case.

Figure 7:
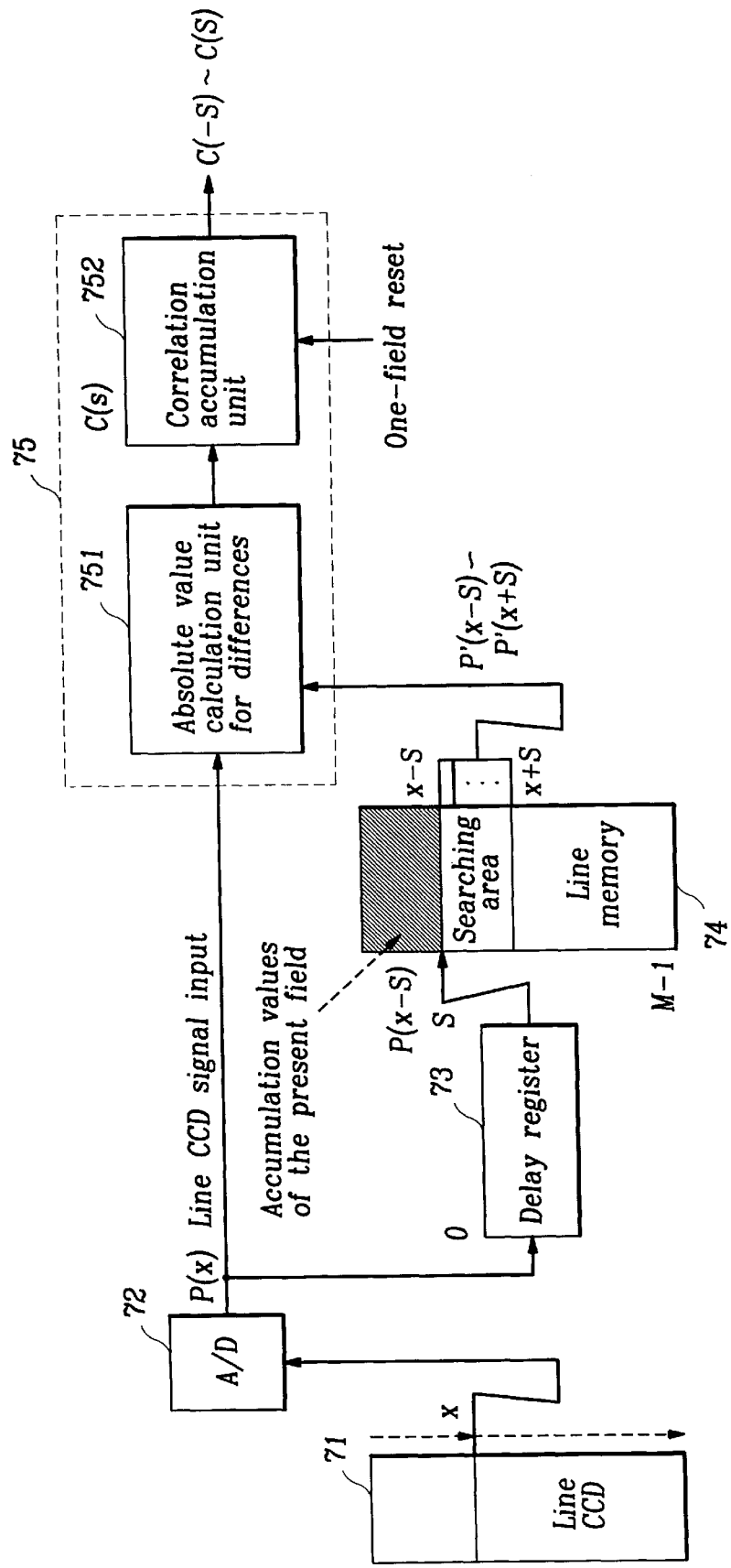
FIG. 7 is a conceptual diagram which shows a method for detecting a motion vector of a camcorder according to an embodiment of the present invention.
Figure 8:
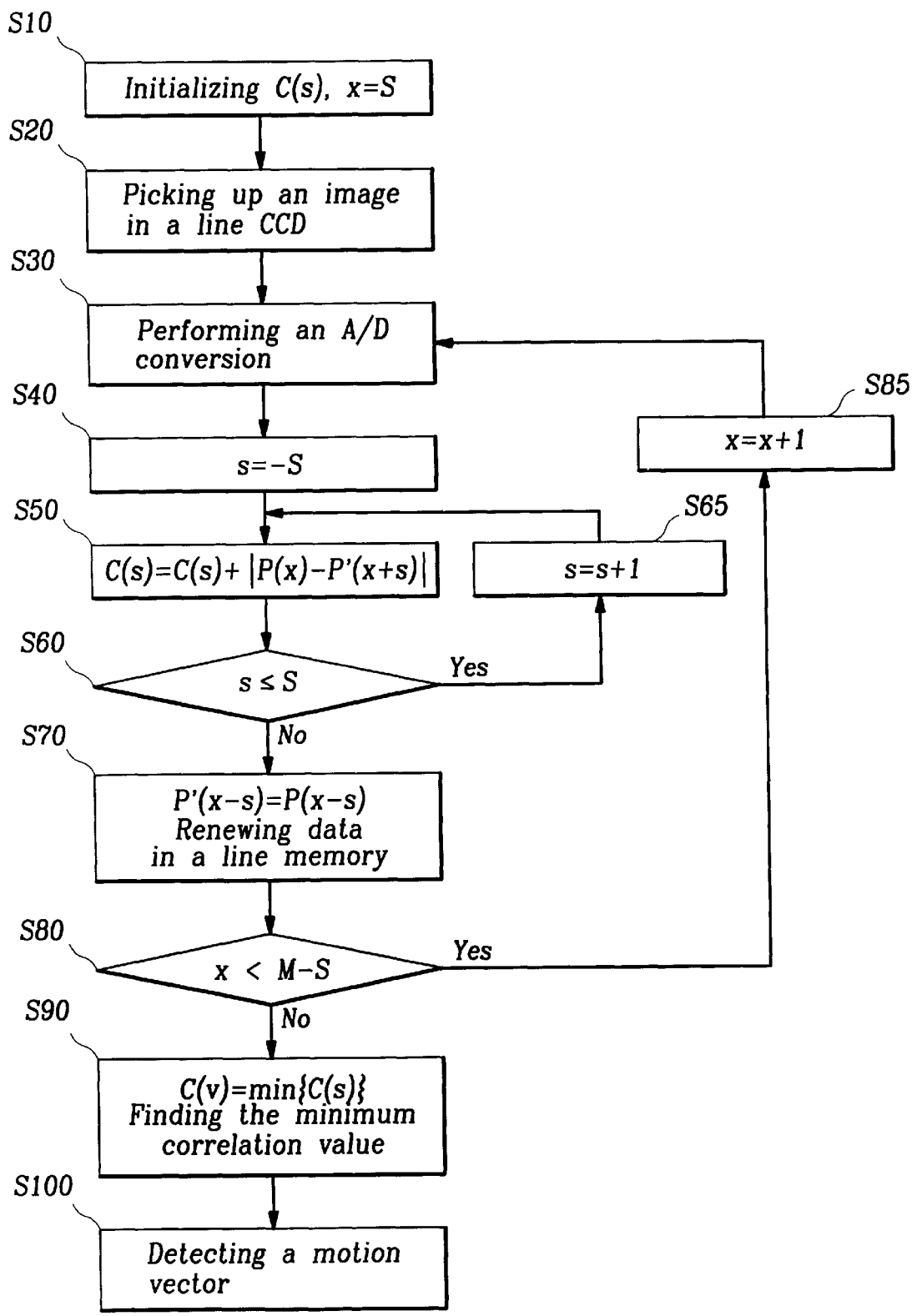
FIG. 8 is a flowchart which shows a method for detecting a motion vector of a camcorder according to an embodiment of the present invention.

FIG. 7 is a conceptual diagram which shows a method for detecting a motion vector of a camcorder according to an embodiment of the present invention; and FIG. 8 is a flowchart which shows a method for detecting a motion vector of a camcorder according to an embodiment of the present invention.

As shown in FIG. 7 and FIG. 8, the method for detecting horizontal and vertical motion vectors is as follows:

Here, because the detecting method of a horizontal direction is the same as the detecting method of a vertical direction, it is assumed that a cumulative value is P(x) a pixel variable of a line CCD is x, and a correlation value is C(s). Also, reference numerals of elements of FIGS. 4, 5 and 6 which correspond to elements of FIG. 7 are shown in parentheses.

In step S10, correlation values C(s) in a correlation arithmetic unit 75 (505 and 510) and pixel parameter x are initialized, in which the correlation arithmetic unit comprises an absolute value calculation unit for differences 751, and a correlation accumulating unit 752;

In step S20, an image is picked up one-dimensionally through a line CCD 71 (44 and 48) in the image pickup units 501 and 506;

In step S30, an xth pixel of the image picked up in the line CCD 71 (44 and 48) is, through an A/D converter 72, converted into a digital signal to be outputted;

In step S40, the limits (−S~S) of a searching area S within a line memory 74 (504 and 509) are defined;

In step S50, in the correlation arithmetic unit 75 (505 and 510), correlation values C(−S)~C(S) between the value of an xth pixel P(x) and the values P'(x−S)~P'(x+S) corresponding to the searching area, are calculated and accumulated, as in the following equation (4):

$$C(s)=C(s)+|P(x)-P'(x-s)| \qquad (4)$$

In step S60, a decision is made whether the calculation has been completed up to the limits of the searching area;

In step S65, if the calculation has not been completed up to the limits of the searching area, a searching location parameter s is increased (s=s+1) in order to return to the step of continuing the calculation and accumulation (S50);

In step S70, if the calculation has been completed up to the limits of the searching area, data in the line memory 74 (504 and 509) are replaced by data in a delay register 73 (503 and 508) to be used as old image data during the calculation of correlation of the next field;

In step S80, a decision is made whether the calculation has been completed, through pipeline processing, successively from the first pixel to the last pixel of an image picked up in the line CCD 71 (44 and 48);

In step S85, if the calculation has not been completed for every pixel of an image picked up in the line CCD 71 (44 and 48), a pixel location parameter x is increased (x=x+1) in order to return to the step of performing the A/D conversion of the next pixel (S30);

In step S90, if the calculation has been completed for every pixel of an image picked up in the line CCD 71 (44 and 48), the minimum value out of the accumulated correlation values is detected;

In the final step S100, the displacement of the detected minimum value is outputted as a motion vector with a particular (horizontal or vertical) direction.

According to the above-mentioned method, a motion vector of a horizontal and a perpendicular can be realized.

As described above, according to preferred embodiments of the present invention, the following effects can be achieved in the process of correcting an unstable image caused by unstable hands.

First, since one-dimensional image data, which are necessary for image correction, are obtained through an optical condensing method, real-time processing is possible.

Second, since the correlation calculation for image data picked up in a line CCD, and the data storage into a line memory are carried out through a pipeline processing method, high-speed processing is possible.

Third, economizing on line memories enables the realization of a simple circuit.

The present invention provides a device and method for detecting a motion vector of a camcorder having the above effects.

What is claimed is:

1. A device for detecting a motion vector of a camcorder comprising:

a vertical image pick-up means for horizontally condensing an inputted images and for converting the horizontally condensed image into an electrical signal to be outputted, a vertical A/D converter for converting an analog signal outputted from said vertical image pick-up means into a vertical digital signal to be outputted;

a vertical delay register for holding the vertical digital signal outputted from said vertical A/D converter for a given time, and then outputting the held vertical digital signal;

a vertical line memory for storing a signal outputted from said vertical delay register;

a vertical correlation arithmetic unit for receiving the vertical digital signal outputted from said vertical A/D converter and a signal from said vertical line memory, and for calculating correlation values between the vertical digital signal and the signal received from said vertical line memory to output a vertical motion vector;

a horizontal image pick-up means for vertically condensing an inputted image, and for converting the vertically condensed image into an electrical signal to be outputted;

a horizontal A/D converter for converting an analog signal outputted from said horizontal image pick-up means into a horizontal digital signal to be outputted;

a horizontal delay register for holding the horizontal digital signal outputted from said horizontal A/D converter for a given time, and then outputting the held horizontal digital signal;

a horizontal line memory for holding a signal outputted from said horizontal delay register; and a horizontal correlation arithmetic unit for receiving the horizontal digital signal outputted from said horizontal A/D converter and a signal from said horizontal line memory, and for calculating correlation values between the horizontal digital signal and the signal from said horizontal line memory to output a horizontal motion vector.

2. A device as set forth in claim 1, wherein said vertical image pick-up means comprises:

two right-angled prisms, the hypotenuses of which are joined to each other to form a reflection surface so that the reflection surface horizontally reflects a two-dimensional image inputted from a camera lens;

a plano convex lens, of which the flat surface faces the reflection surface of said two right-angled prisms, which horizontally condenses the two-dimensional image reflected by the reflection surface into a one-dimensional image to be outputted; and a line CCD which converts the one-dimensional image outputted from said plano convex lens into a one-dimensional electrical signal.

3. A device as set forth in claim 1, wherein said horizontal image pick-up means comprises:

two right-angled prisms, the hypotenuses of which are joined to each other to form a reflection surface so that the reflection s surface vertically reflects a two-dimensional image inputted from a camera lens;

a piano convex lens, of which the flat surface faces the reflection surface of said two right-angled prisms, which vertically condenses the two-dimensional image reflected by the reflection surface into a one-dimensional image to be outputted; and a line CCD which converts the one-dimensional image outputted from said plano convex lens into a one-dimensional electrical signal.

4. A method for detecting a motion vector of a camcorder comprising the steps of:

initializing correlation values;

using a line CCD image pick-up means to pick up an image which has been condensed to a one-dimensional image;

performing an A/D conversion of an xth pixel out of the image picked up in the line CCD image pick-up means;

defining limits of a searching area within a line memory;

calculating a correlation value between the value of the xth pixel and a value within the searching area and accumulating the correlation value;

deciding whether the calculating has been completed up to the limits of the searching area;

increasing a searching location parameter, and returning to the step of calculating the correlation in case the calculating has not been completed up to the limits of the searching area;

renewing data in the line memory, in case that the calculating has been completed up to the limits of the searching area;

deciding whether the calculating has been completed for every pixel picked up in the line CCD image pick-up means;

increasing a pixel location parameter, and returning to the step of performing the A/D conversion of the next pixel in case that the calculating has not been completed for every pixel picked up in the line CCD image pick-up means;

detecting a minimum correlation value among the accumulated correlation values, when the calculating has been completed for every pixel condensed in the line CCD image pick-up means; and outputting a displacement of the minimum correlation value as a motion vector with a particular direction.

5. A method as stated in claim 4, characterized in that data in said line memory are replaced by data in a delay register, and that the replaced data are used as old image data in the correlation calculation of a next field.

6. An image pick-up device comprising:

two right-angled prisms, the hypotenuses of which are joined to each other to form a reflection surface so that the reflection surface may reflect a two-dimensional image;

a plano convex lens, of which the flat surface faces the reflection surface of said two right-angled prisms, which condenses a two-dimensional image reflected by the reflection surface into a one-dimensional image to be outputted; and a line CCD which converts the one-dimensional image outputted from said plano convex lens into a one-dimensional electrical signal.

7. An image correction system of a camcorder, comprising:

a solid state image pick-up means for picking up an inputted image in a solid state device through an optical system, scanning the image electronically within the solid state device, and converting the image into an analog signal to be outputted;

an A/D converter which converts the analog signal outputted from said solid state pick-up device into a digital signal to be outputted;

a camera signal processing means for converting the digital signal outputted from said A/D converter into a color and brightness signal to be outputted;

a motion vector detecting means for receiving the same image that is inputted to said solid state image pick-up means through separate image pick-up means, condensing the same image that is inputted to said solid state image pick-up means to a horizontally condensed image and to a vertically condensed image, detecting a motion vector caused by unstable hands based on said horizontally condensed image and said vertically condensed image, and outputting the motion vector;

a memory control means for receiving the motion vector outputted from said motion vector detecting means to control a location of an area to be corrected;

a field memory which holds one of a field unit and a frame unit of image data outputted from said camera signal processing means and, according to image correction control by said memory control means, outputs a stabilized digital image signal; and a D/A converter which converts the stabilized digital image signal output from said field memory into an analog image signal to be outputted.

8. An image correction system of a camcorder, comprising:

a motion vector detecting means for receiving an image through an image pick-up means, condensing the received image to a horizontally condensed image and to a vertically condensed image, detecting a motion vector caused by unstable hands based on said horizontally condensed image and said vertically condensed image, and outputting the motion vector;

a CCD control means for receiving the motion vector outputted from said motion vector detecting means to output a signal for controlling a location of an area to be corrected;

a solid state image pick-up means for receiving the same image that is inputted to said motion vector detecting means through an optical system, and converting the image into an electrical signal to output a corrected analog image signal according to a control signal outputted from said CCD control means;

an A/D converter which converts the corrected analog image signal outputted from said solid state image pick-up means into a digital signal to be outputted;

a camera signal processing means for converting the digital signal outputted from said A/D converter into a color and brightness signal to be outputted; and a D/A converter which converts the color and brightness signal outputted from said camera signal processing means into an analog image signal to be outputted.

9. A system as set forth in claim 7, wherein said motion vector detecting means comprises:

a vertical image pick-up means for horizontally condensing the same image that is inputted to said solid state image pick-up means to the horizontally condensed image, and converting the horizontally condensed image into an analog signal to be outputted;

a vertical A/D converter which converts the analog signal outputted from said vertical image pick-up means into a vertical digital signal to be outputted;

a vertical delay register which holds the vertical digital signal outputted from said vertical A/D converter for a time during which pixels corresponding to half of a searching area are processed, and then outputs the held vertical digital signal;

a vertical line memory which stores the held vertical digital signal outputted from said vertical delay register;

a vertical correlation arithmetic unit for receiving the vertical digital signal outputted from said vertical A/D converter and a signal from said vertical line memory, and calculating correlation values between the vertical digital signal and the signal from said vertical A/D converter to output a vertical motion vector;

a horizontal image pick-up means for vertically condensing the same image that is inputted to said solid state image pick-up means to the vertically condensed image, and converting the vertically condensed image into an analog signal to be outputted;

a horizontal A/D converter which converts the analog signal outputted from said horizontal image pick-up means into a horizontal digital signal to be outputted;

a horizontal delay register which holds the horizontal digital signal outputted from said horizontal A/D converter for a time during which pixels corresponding to half of a searching area are processed, then outputs the held horizontal digital signal;

a horizontal line memory which stores the held horizontal digital signal outputted from said horizontal delay register; and a horizontal correlation arithmetic unit for receiving the horizontal digital signal outputted from said horizontal A/D converter and a signal from said horizontal line memory, and calculating correlation values between the horizontal digital signal and the signal from said horizontal line memory to output a horizontal motion vector.

10. A system as set forth in claim 9, wherein said vertical image pick-up means comprises:

two right-angled prisms, the hypotenuses of which are joined to each other to form a reflection surface so that the reflection surface horizontally reflects a two-dimensional image inputted from a camera lens;

a plano convex lens, the flat surface of which faces the reflection surface of said two right-angled prisms, which horizontally condenses the two-dimensional image reflected by the reflection surface into a one-dimensional image to be outputted; and a line CCD which converts the one-dimensional image outputted from said plano convex lens into a one-dimensional electrical signal.

11. A system as set forth in claim 9, wherein said horizontal image pick-up means comprises:

two right-angled prisms, the hypotenuses of which are joined to each other to form a reflection surface so that the reflection surface vertically reflects a two-dimensional image inputted from a camera lens;

a plano convex lens, the flat surface of which faces the reflection surface of said two right-angled prisms, which vertically condenses the two-dimensional image reflected by the reflection surface into a one-dimensional image to be outputted; and a line CCD which converts the one-dimensional image outputted from said plano convex lens into a one-dimensional electrical signal.

12. A system as set forth in claim 8, wherein said motion vector detecting means comprises:

a vertical image pick-up means for horizontally condensing the received image to the horizontally condensed image, and converting the horizontally condensed image into an analog signal to be outputted;

a vertical A/D converter which converts the analog signal outputted from said vertical image pick-up means into a vertical digital signal to be outputted;

a vertical delay register which holds the vertical digital signal outputted from said vertical A/D converter for a time during which pixels corresponding to half of a searching area are processed, and then outputs the held vertical digital signal;

a vertical line memory which stores the held vertical digital signal outputted from said vertical delay register;

a vertical correlation arithmetic unit for receiving the vertical digital signal outputted from said vertical A/D converter and a signal from said vertical line memory, and calculating correlation values between the vertical digital signal and the signal from said vertical A/D converter to output a vertical motion vector;

a horizontal image pick-up means for vertically condensing the received image to the vertically condensed image, and converting the vertically condensed image into an analog signal to be outputted;

a horizontal A/D converter which converts the analog signal outputted from said horizontal image pick-up means into a horizontal digital signal to be outputted;

a horizontal delay register which holds the horizontal digital signal outputted from said horizontal A/D converter for a time during which pixels corresponding to half of a searching area are processed, then outputs the held horizontal digital signal;

a horizontal line memory which stores the held horizontal digital signal outputted from said horizontal delay register; and a horizontal correlation arithmetic unit for receiving the horizontal digital signal outputted from said horizontal A/D converter and a signal from said horizontal line memory, and calculating correlation values between the horizontal digital signal and the signal from said horizontal line memory to output a horizontal motion vector.

13. A system as set forth in claim 12, wherein said vertical image pick-up means comprises:

two right-angled prisms, the hypotenuses of which are joined to each other to form a reflection surface so that the reflection surface horizontally reflects a two-dimensional image inputted from a camera lens;

a plano convex lens, the flat surface of which faces the reflection surface of said two right-angled prisms, which horizontally condenses the two-dimensional image reflected by the reflection surface into a one-dimensional image to be outputted; and a line CCD which converts the one-dimensional image outputted from said plano convex lens into a one-dimensional electrical signal.

14. A system as set forth in claim 12, wherein said horizontal image pick-up means comprises:

two right-angled prisms, the hypotenuses of which are joined to each other to form a reflection surface so that the reflection surface vertically reflects a two-dimensional image inputted from a camera lens;

a plano convex lens, the flat surface of which faces the reflection surface of said two right-angled prisms, which vertically condenses the two-dimensional image reflected by the reflection surface into a one-dimensional image to be outputted; and a line CCD which converts the one-dimensional image outputted from said plano convex lens into a one-dimensional electrical signal.

* * * * *